Aug. 31, 1937.  H. J. OSTENDORF  2,091,608
JOINT FOR DOUBLE WALL HOT AIR PIPES
Filed June 22, 1936  2 Sheets-Sheet 1
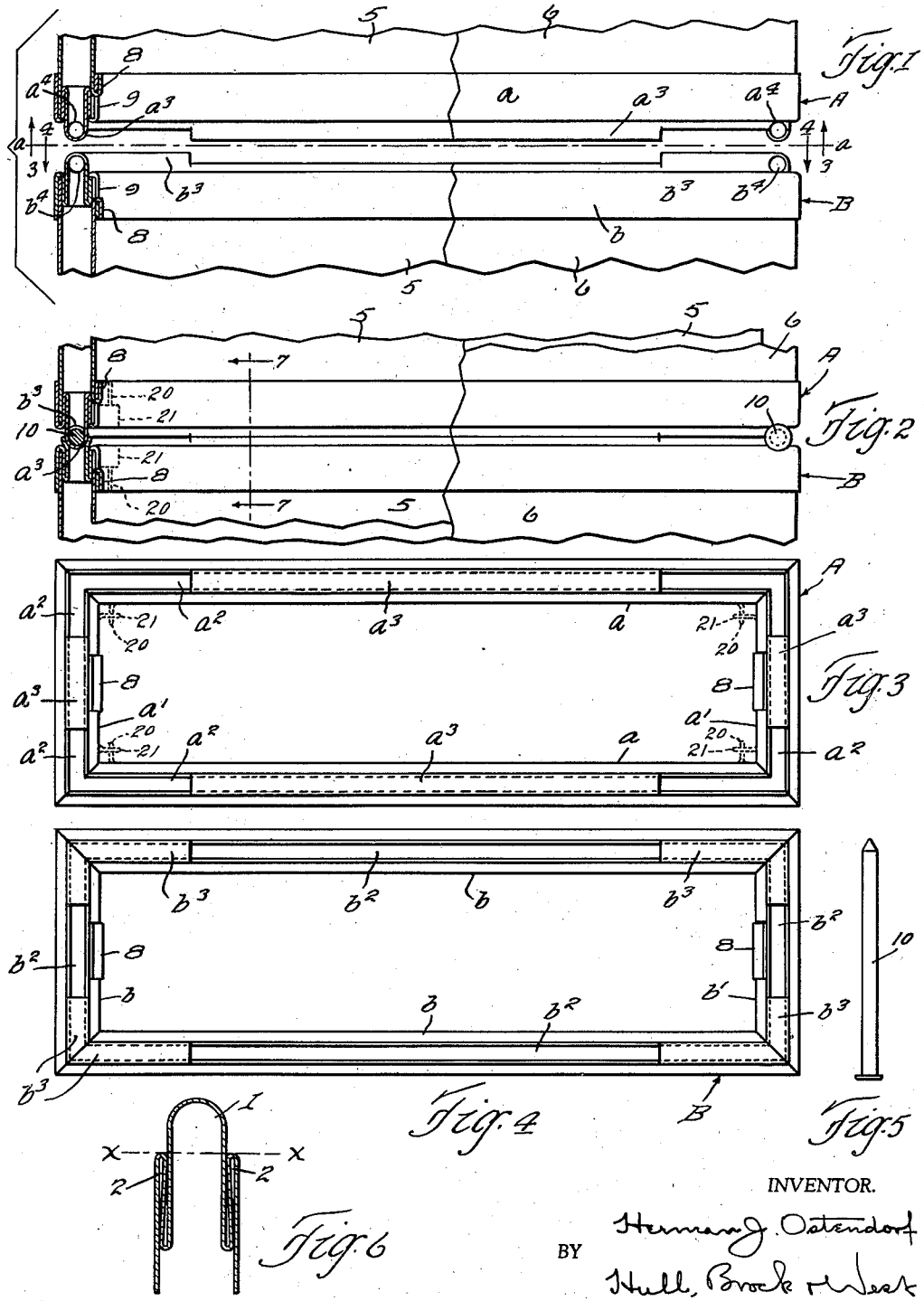
INVENTOR.
Herman J. Ostendorf
BY
Hull, Brock and West
ATTORNEYS.

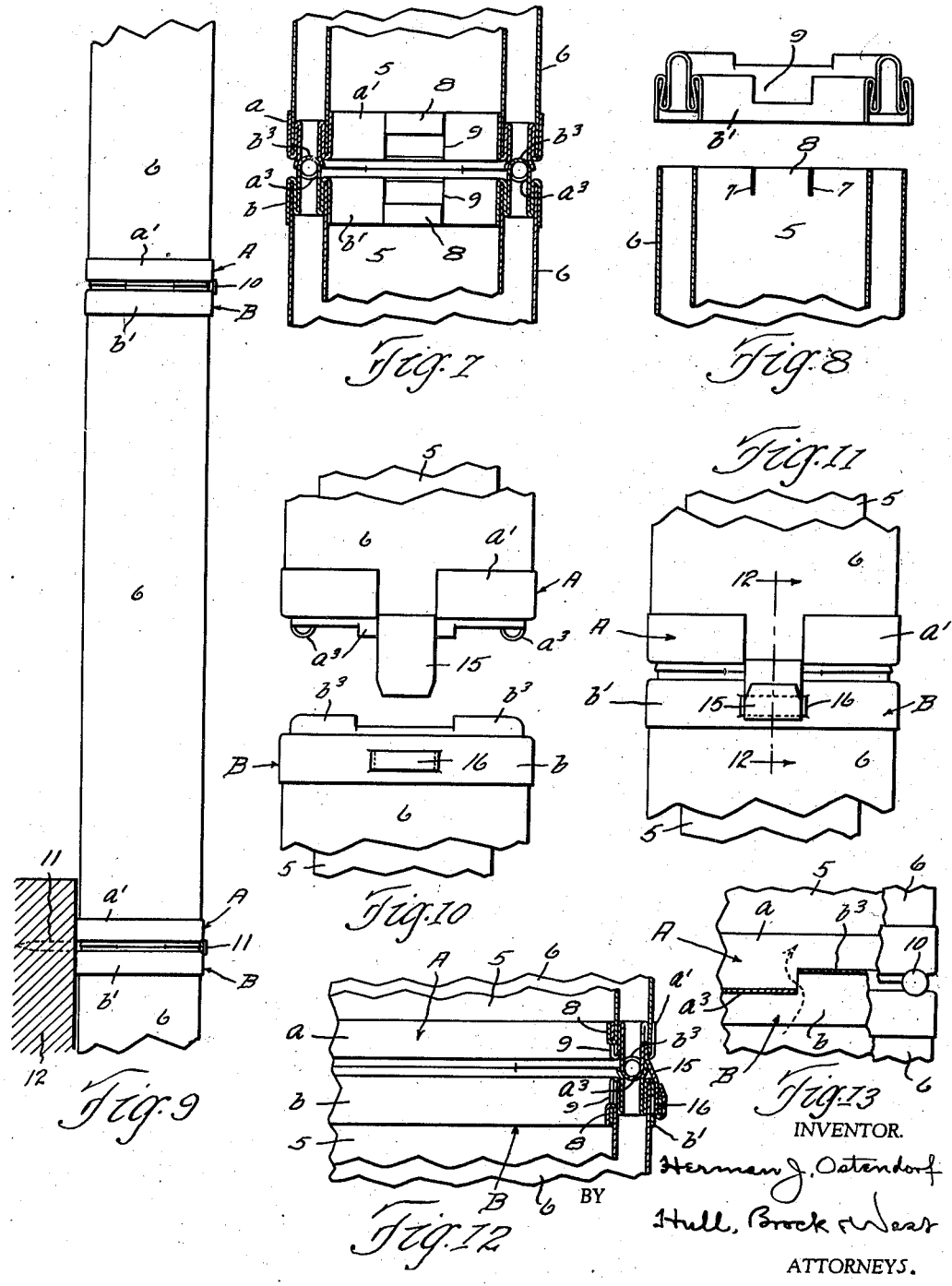

Patented Aug. 31, 1937

2,091,608

UNITED STATES PATENT OFFICE 2,091,608

JOINT FOR DOUBLE WALL HOT AIR PIPES

Herman J. Ostendorf, Lakewood, Ohio, assignor of one-third to Leo F. Oranski, Cleveland, Ohio Application June 22, 1936, Serial No. 86,482

10 Claims. (Cl. 138—63)

This invention is an improved joint for double wall pipes of the class used in hot air heating systems of houses and other buildings.

As is well known, pipes of the class referred to are made in sections, and at the time of installation the sections are joined together in end to end relation. Heretofore the inner and outer walls of each section have been permanently connected together at the time the sections were made and the ends of the sections were so fashioned as to interfit with the ends of adjoining sections thereby to practically seal the joints thus formed.

In order to adapt these manufactured pipe sections as nearly as possible to all conditions encountered in practice, the sections were made in a number of standard lengths, varying from 24" to 2", so that by selecting a certain combination, a required length of pipe could be approximated. However, in a high percentage of instances a section would have to be cut, leaving an unfinished end that would necessitate a makeshift connection with an adjoining section. Also, dealers and contractors had to carry a considerable stock if they were to meet the requirements of the majority of cases and this was made especially undesirable by the bulk of the sections.

It is the primary purpose of my invention to provide a joint for double wall pipes of the class above mentioned that is composed of a number of detached members, all desirably of the same normal cross section, adapted for ready application to the adjacent unfinished ends of the inner and outer walls of adjoining sections, the same being notched or slotted in such manner as to render those intended for application to one end of one section complemental to those meant for use on the adjacent end of an adjoining section.

The principal advantages derived from the invention are that inner and outer wall sections of but one length need be carried in stock, and being of the usual rectangular cross section they may be collapsed for storage and shipment by flattening the two walls on one side of the diagonal axis of each section against those on the other side of said axis and when it is desired to make an installation the flattened wall sections are restored to rectangular form and an inner one placed within an outer one when the members of my improved joint may be slipped into place over the ends of the wall sections thereby to connect the inner and outer walls together and properly space them apart. If the installation requires a section shorter than the standard length, the inner and outer walls of a section are individually cut to the desired dimension before the section is assembled, and in many cases the part removed may be used in another conduit assembly thereby to avoid waste.

In sectional double wall hot air pipes it is desirable that the insulating spaces between the walls of the several sections of the pipe be in free communication. The manner in which the opposed members of my improved joint interfit insures attainment of this desideratum.

Other objects of the invention are to provide simple means for fastening the joint members to the wall sections consisting solely of interlocking parts integral with both; and to provide equally simple and efficient means for locking interengaged joint members of the adjacent pipe sections together, one form of the latter means serving the additional purpose of anchoring the pipe to a structural member of the building and supporting the pipe in proper position within a wall or partition.

Objects and advantages additional to the foregoing will appear as I proceed to describe the invention by reference to the accompanying drawings wherein Fig. 1 is a side elevation partly in section of the separated adjacent ends of adjoining conduit sections equipped with my improved joint; Fig. 2 is a similar view showing the sections connected together by means of the joint; Figs. 3 and 4 are views on the line a—a of Fig. 1, the respective views being taken as though looking in the direction of the arrows 3, 3 and 4, 4 that are associated with said line; Fig. 5 is a view of one of the locking pins used in one form of the joint; Fig. 6 is an enlarged transverse section through a joint member showing the normal cross section thereof; Fig. 7 is a section on the correspondingly numbered line of Fig. 2; Fig. 8 is a transverse section through the ends of the inner and outer walls of a pipe with a joint member designed for application thereto spaced above said ends; Fig. 9 is a fragmentary side elevation of a hot air pipe assembly incorporating my improved joints and showing the fastening means of one of the joints modified to serve the additional purpose of securing the pipe to a structural member of the building so as to support and properly position the pipe; Fig. 10 is an elevational view of the separated adjacent ends of adjoining pipe sections equipped with a joint incorporating a modified form of the means for fastening opposed members of the joint together; Fig. 11 is a similar view showing the pipe sections together and the fastening means in locked condition; Fig. 12 is a section on the line 12—12 of Fig. 11, and Fig. 13 is a sectional detail disclosing how the insulating spaces of adjoining pipe sections communicate.

Each joint is made up of two sets of members, one for application to an end of one pipe section, and the other for application to the adjacent end of an adjoining pipe section. In the drawings, one set is designated generally by the reference letter A, and the other by the reference letter B. The set A is composed of two identical side members $a$, and duplicate end members $a'$. The respective side and end members of the set B are designated $b$ and $b'$.

The joint members are constructed of sheet metal of suitable gauge, and all are of the same normal cross section, such being illustrated in Fig. 6. By normal cross section is meant the cross section as it is unaffected by notching or slotting. The piece of sheet metal from which a joint member is formed is folded on a radius along its longitudinal center to form a semi-cylindrical ridge 1 (Fig. 6), the base of the ridge, designated by the line $x$—$x$ in Fig. 6, being spaced from the crest of the ridge a distance substantially equal to the width thereof. Along lines parallel with and a substantial distance from the base of the ridge, the side portions of the sheet metal piece are bent outwardly and back upon themselves and then along lines adjacent the base, said portions are given a reverse bend to provide channels 2.

The ends of all joint members of each of the sets A and B are mitered, as best shown in Figs. 3 and 4, and all members of the former set have the end portions of their ridges cut away or notched to provide slots $a^2$ (Fig. 3), while the intervening portions constitute tongues $a^3$. All members of the other set have their central portions cut away to provide slots $b^2$, leaving beyond the ends thereof the tongues $b^3$ (Fig. 4).

As previously stated, the sectional double wall pipe with which the joint is intended for use is of rectangular cross section, and the respective inner and outer walls of each section are designated 5 and 6. With the walls arranged one within the other, the joint members of a set may be readily applied thereto by pressing the members down over such ends to frictionally engage said ends within the channels 2 of the joint members. The end of each of the narrower panels of the inner wall section is slit at 7 (Fig. 8) to provide a tongue 8, and the joint member intended for cooperation with such end has a relatively wide notch 9 that registers with the tongue 8 when the parts are assembled, and over the lower edge of which the tongue 8 may be bent, as clearly shown in several of the views. Thus, the end members $a'$ and $b'$ are secured against withdrawal from the pipe sections.

In assembling a pipe, sections to the ends of which joint members have been applied are disposed one over and in alignment with another so that the tongues $a^3$ of the joint members of each set A may be engaged within the slots $b^2$ of the members of the opposed set B, the tongues $b^3$ of the latter set at the same time entering the slots $a^2$ of the set A. The parts are pressed together until the tongues, constituted of the semi-cylindrical ridges of the members of the opposed sets, are in axial alignment. This causes a wedging of the tongues into the slots and a spreading of the sides of the latter, and inasmuch as the sheet metal is somewhat resilient, the parts are placed sufficiently under tension to insure an enduring tight joint. The parts are held in this condition by pins 10 that are adapted to be inserted through holes $b^4$ and notches $a^4$ in the ends of the ridge portions of the respective members $a$ and $b$ and thence through the aligned interiors of the tongues $a^3$ and $b^3$ of the opposed end members $a'$ and $b'$ of the joint. With said end members locked together by means of the pins 10, and to the pipe sections by means of the tongues 8, the entire assembly is made very secure.

As shown in Fig. 9, long nails or spikes, one of which is designated 11 in said view, may be substituted for the pins 10 and driven into a sill or other structural member 12 of a building in which the installation is made so as to support the pipe and sustain it in proper position.

An alternative means for locking opposed members of the joint together is illustrated in Figs. 10, 11 and 12. Here, a tongue 15 is struck from the outer side of the body portion of each end member $a'$ and, when the opposed members are properly fitted together, as shown in Figs. 11 and 12, the tongue is engaged through a loop 16 of the adjacent member $b'$ and bent upwardly about the same.

Although there is no possibility of the side members $a$ and $b$ of the joints becoming displaced after the joints are locked in either of the ways above described, there may be an advantage in securing said members against accidental withdrawal from the pipe sections in the handling of said sections prior to and during installation, and this may be conveniently done by turning tongues 20 inwardly from the ends of the side members of the joint and disposing them beneath similar tongues 21 of the end members, such an arrangement being indicated in dotted lines in Figs. 2 and 3.

Although my invention provides tight joints for sectional double wall hot air pipes, it permits that desirable free communication between the insulating spaces of the pipe sections, as will be clear from an inspection of Fig. 13 where the path of communcation between the insulating spaces of adjoining sections is indicated by the dotted line arrow.

Having thus described my invention, what I claim is:

1. A joint for sectional double wall pipes wherein each pipe section consists of an inner wall and an outer wall surrounding and spaced from the inner wall, said joint comprising a plurality of members for application to the adjacent ends of adjoining pipe sections, all members of the joint including those on both adjoining pipe sections being of the same normal cross section and each including a longitudinal ridge projecting beyond the end of the pipe section to which it is applied and channels along opposite sides thereof facing in the opposite direction from that in which said ridge projects, the channels being adapted to be applied to the ends of the inner and outer walls of a section, all joint members having parts of their ridges cut away to provide voids and in such manner that those members intended for use on the end of one section are complemental to those for use on the adjacent end of an adjoining section so that the retained parts of the ridges of the members of one section extend through the voids of the members on the adjoining section.

2. A joint for sectional double wall pipes comprising a plurality of members for application to the adjacent ends of adjoining pipe sections, all members of the joint being of the same normal cross section and each including a longitudinal ridge projecting in one direction and channels along opposite sides thereof facing in the opposite direction, the channels being adapted to be applied to the ends of the inner and outer walls of a section, the members having parts cut away in such manner that those intended for use on the end of one section are complemental to those for use on the adjacent end of an adjoining section, parts of certain of the members interlocking with parts of the walls to which they are applied for securing them against withdrawal from said walls.

3. A joint for sectional double wall pipes comprising a plurality of members for application to the adjacent ends of adjoining pipe sections, all members of the joint being of the same normal cross section and each including a longitudinal ridge projecting in one direction and channels along opposite sides thereof facing in the opposite direction, the channels being applied to the ends of the inner and outer walls of a section, the members having parts cut away in such manner that those on the end of one section are complemental to those on the adjacent end of an adjoining section, certain of the members being slotted, and the wall sections to which they are applied having tongues engaged through said slots and turned over.

4. A joint for sectional double wall pipes comprising a plurality of members for application to the adjacent ends of adjoining pipe sections, each member of the joint including a hollow longitudinal ridge and parts adapted to be applied respectively to the ends of the inner and outer walls of a section, the ridges of the members being cut away at intervals to provide spaced tongues, those of opposed members of the joint being adapted to be disposed in overlapping and aligned relation, certain of the members being fastened to the walls to which they are applied, and locking means adapted to be inserted through the overlapping aligned tongues of said members.

5. A joint for sectional double wall pipes comprising two sets of joint members for application respectively to the adjacent ends of adjoining pipe sections, the joint members being constructed of sheet metal and all having the same normal cross section, each member including a central longitudinal ridge projecting in one direction and channels along opposite sides thereof facing in the opposite direction, the channels being adapted to be applied to the ends of the inner and outer walls of a pipe section, the members having their longitudinal ridges cut away at intervals to produce alternating tongues and slots and in such manner that those members for application to the end of one section are complemental to those for application to the adjacent end of an adjoining section and so that the tongues of the members of one set are adapted to be inserted in the slots of the members of the other set.

6. A joint for sectional double wall pipes comprising two sets of members for application respectively to the adjacent ends of adjoining pipe sections, the joint members being constructed of sheet metal and all having the same normal cross section, each including a central longitudinal ridge projecting in one direction and channels along opposite sides thereof facing in the opposite direction, the channels being adapted to be applied to the ends of the inner and outer walls of a pipe section, the members having their longitudinal ridges cut away at intervals to produce alternating tongues and slots and in such manner that the tongues of those members for application to the end of one section are adapted to be received by the slots in the members for application to the adjacent end of an adjoining section, certain of the opposed members of the two sets being fastened to the wall sections to which they are applied, and locking pins for insertion through the overlapping tongues of said opposed members thereby to secure them together.

7. A joint for sectional double wall pipes comprising a plurality of members for application to the adjacent ends of adjoining pipe sections, each member being constructed of a piece of sheet metal folded along its longitudinal center to provide a semi-cylindrical ridge whose base is spaced from its crest a distance corresponding approximately to its width, the sides of the piece of sheet metal being turned outwardly and upon themselves along lines parallel to and spaced from the base of the ridge and then reversely folded on lines parallel to and adjacent the base to provide channels, the channels being adapted to be applied to the ends of the inner and outer walls of adjacent sections, the ridges of the joint members being notched at intervals to provide alternating tongues and slots and in such manner that the tongues of the members intended for application to the end of one section are adapted to be inserted in the slots of those for application to the adjacent end of an adjoining section.

8. A joint for sectional double wall pipes comprising a plurality of members for application to the adjacent ends of adjoining pipe sections, each member being constructed of a piece of sheet metal folded along its longitudinal center to provide a semi-cylindrical ridge whose base is spaced from its crest a distance corresponding approximately to its width, the sides of the piece of sheet metal being turned outwardly and upon themselves along lines parallel to and spaced from the base of the ridge and then reversely folded on lines parallel to and adjacent the base to provide channels, the channels being adapted to be applied to the ends of the inner and outer walls of adjacent sections, the ridges of the joint members being notched at intervals to provide alternating tongues and slots and in such manner that the tongues of the members intended for application to the end of one section are adapted to be inserted in the slots of those for application to the adjacent end of an adjoining section, certain of the members being fastened to the pipe sections, and pins for projection through the overlapping tongues of opposed ones of said members.

9. A joint for sectional double wall pipes comprising a plurality of members for application to the adjacent ends of adjoining pipe sections, all members of the joint being of the same normal cross section and each including a longitudinal ridge projecting in one direction and channels along opposite sides thereof facing in the opposite direction, the channels being applied to the ends of the inner and outer walls of a section, the members having parts cut away in such manner that those on the end of one section are complemental to and thereby adapted to interengage with those on the adjacent end of an adjoining section, certain opposed ones of the members being fastened to the wall sections to which they are applied and having tongues and loops respectively for interlocking engagement.

10. A joint for sectional double wall pipes comprising a plurality of members for application to the adjacent ends of adjoining pipe sections, all members of the joint being of the same normal cross section and each including a longitudinal ridge projecting in one direction and channels along opposite sides thereof facing in the opposite direction, the channels being adapted to be applied to the ends of the inner and outer walls of a section, the members having parts cut away in such manner that those intended for use on the end of one section are complemental to those for use on the adjacent end of an adjoining section, certain of the members being fastened to the walls to which they are applied while said certain members cooperate with the remaining members to hold the latter against withdrawal from the walls on which they are mounted.

HERMAN J. OSTENDORF.